Dec. 20, 1966   A. G. PAUL   3,292,911
MIXING DEVICE HAVING ADJUSTABLE WALL SCRAPERS
Filed March 22, 1965   2 Sheets-Sheet 1

INVENTOR:
ALAIN G. PAUL
BY:
HIS ATTORNEY

Dec. 20, 1966    A. G. PAUL    3,292,911
MIXING DEVICE HAVING ADJUSTABLE WALL SCRAPERS
Filed March 22, 1965    2 Sheets-Sheet 2

INVENTOR:
ALAIN G. PAUL
BY:
HIS ATTORNEY

United States Patent Office 3,292,911
Patented Dec. 20, 1966

3,292,911
MIXING DEVICE HAVING ADJUSTABLE
WALL SCRAPERS
Alain G. Paul, Paris, France, assignor to Shell Oil Company, New York, N.Y., a corporation of Delaware
Filed Mar. 22, 1965, Ser. No. 441,455
Claims priority, application France, Mar. 23, 1964,
968,321, Patent 1,397,988
2 Claims. (Cl. 259—109)

This invention relates to mixing devices and more particularly to vessels having an agitator disposed therein, with the agitator rotating within the vessel to mix or blend the ingredients placed in the vessel. In numerous process applications, in particular the manufacture of thermoplastic molding compositions, it is essential to obtain a homogeneous mixture of pasty or semi-fluid materials.

Such mixtures are conventionally prepared in vessels in which the ingredients are placed, a mobile stirring device ensuring the required homogenization. Preferably, a cylindrical vessel is used, in which an agitator or stirring device is axially and rotatably arranged.

This stirring device advantageously comprises a cylindrical helix or a set of cylindrical helices and is arranged around a shaft positioned within the cylindrical vessel and coinciding with the axis of the latter. The helix or helices form the agitating or mixing elements of the stirring device. The peripheral parts of the helices are situated a very short distance from the peripheral wall of the vessel. For example, for a vessel having a volume of four cubic meters the average clearance between the wall of the vessel and the peripheral parts of the stirrer while moving is on the order of 4 mm. Obviously, there can only be question of average clearance since the actual clearance depends on the centering of the shaft and the irregularities of the inner surface of the vessel. Any clearance, even a very slight one, results in a space along the wall of the vessel which is never penetrated by an element of the stirring device while moving. Conseqenntly, since there exists a stagnant region, there forms along the wall of the mixing vessel a layer which is not involved in the stirring movement to which the contents of the mixer are subjected. This layer develops very differently from the rest of the mixture. Initially, since the layer has not been stirred, it remains non-homogeneous; then it may polymerize or in a general manner undergo specific chemical reactions of such a nature that finally it is entirely different from the rest of the mixture both as regards its chemical composition and its physical structure. When part of this layer separates and moves towards the center of the vessel, this results in a "contamination" of the contents of the mixing vessel; the homogeneity of the mixture, both physically and chemically, disappears, at least in places.

This phenomenon is well known. It is conventionally remedied by periodic removal of the layer formed on the wall of the mixing vessel by scraping. However, such a solution is not entirely satisfactory and besides it cannot be applied in the case where it is desired to keep the vessel under uniform conditions of temperature and pressure, for example, for the preparation of thermoplastic molding compositions which require a vessel wall temperature of 180° C.

The object of the present invention is to provide an improved stirring device for a mixing vessel which completely obviates the formation of an unmixed layer on the inner walls of the vessel and the above-mentioned problems.

More particularly, the invention relates to a stirring device positioned inside a mixing vessel and movable therein, characterized in that the parts of the device nearest the inner wall of the vessel are provided with scraping members, a part at least of each member being pressed resiliently against the said wall in such a manner that the surface of the vessel wall is scraped when the stirring device is turning.

Preferably, the vessel is cylindrical and the stirring device comprises one or several sections of cylindrical helices arranged around a central shaft mounted coaxially within the vessel. The scraping members of such a stirring device are arranged on the parts of the helical sections furthest from the shaft. The scraping members are preferably orientated parallel to the axis of the vessel and the projection of all the scraping members on the axis of the vessel covers the full axial length of the latter, with or without overlapping.

It is also possible to arrange the scraping members along the outer edge of the stirring device and parallel to this edge. In this case, scraping members may be arranged over the full length or only on certain sections of the edge. When the scraping members are arranged on sections, it is advantageous for the projection of the sections on the shaft of the vessel to correspond with the full length of the latter. When the structure is a helix, the use of sections with a rather limited surface permits scraping members to be arranged on relatively flat portions (sectors of a helix). Each scraping member consists of, for instance, a scraping blade, mounted in a longitudinal groove of an elongated support secured to the stirring device proper and running parallel to the axis of the vessel, springs being arranged to press the scraping blade out of this groove in order to bring it into contact with the wall of the vessel.

The scraping blade may be made of metal or plastic material which is sufficiently rigid. For certain operating conditions the scraping blade is advantageously made of tetrafluoroethylene, known by the trademark "Teflon." Instead of a blade as such use may also be made of an element having the structure of a comb or brush.

This invention will be more easily understood from the following description and the attached drawings in which.

Figure 1:
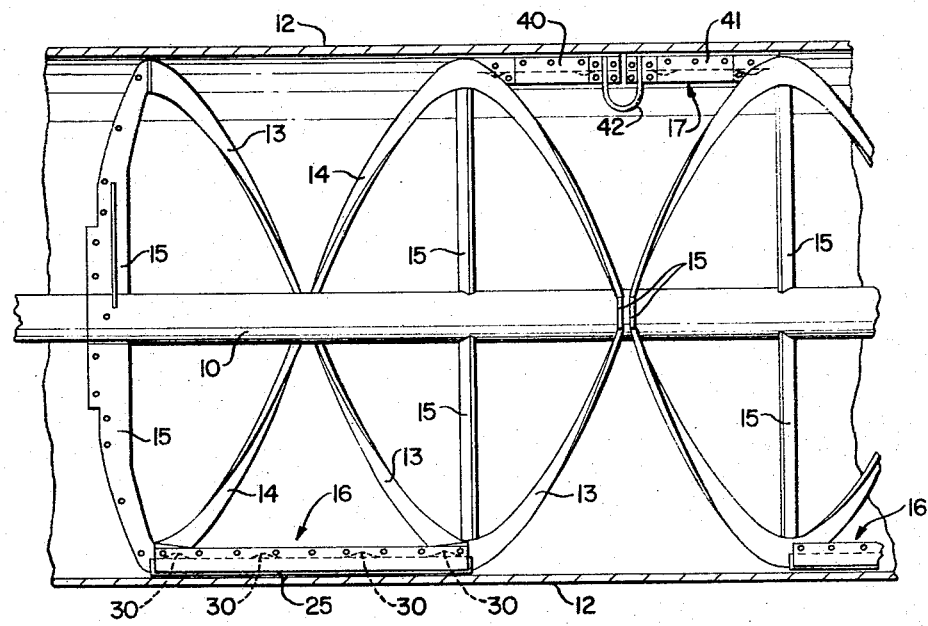
FIGURE 1 is a diagram showing a partial longitudinal view of a stirrer constructed according to this invention and adapted for use in a cylindrical mixing vessel.
Figure 2:
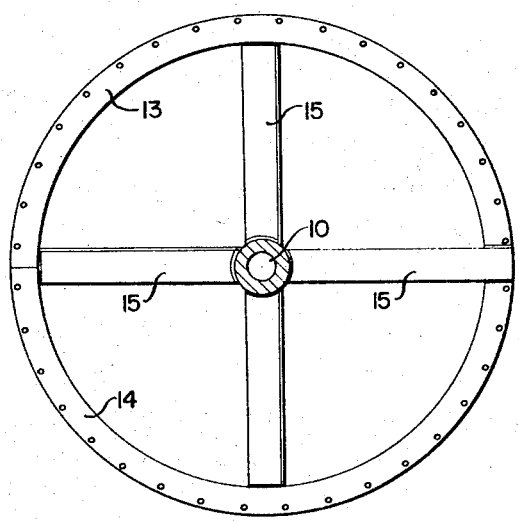
FIGURE 2 is a left-hand view of the stirrer shown in FIGURE 1.

The stirrer according to the invention comprises a shaft 10 suitably arranged coaxially with the axis of a cylindrical vessel 12. Two helical members 13 and 14 with reversed pitch are attached to the shaft by radial supporting arms 15, axially and circumferentially staggered along the shaft 10. All these elements may be made of stainless steel or similar corrosion resistant materials.

A plurality of scraping members 16 are mounted on the helical members 13 and 14 in parallel relationship to the shaft 10. There are, for example, two diametrically opposed series of alternating scraping members 16; the members of the one series are designated by the reference number 16, the members of the other series by the reference number 17.

Figure 3:
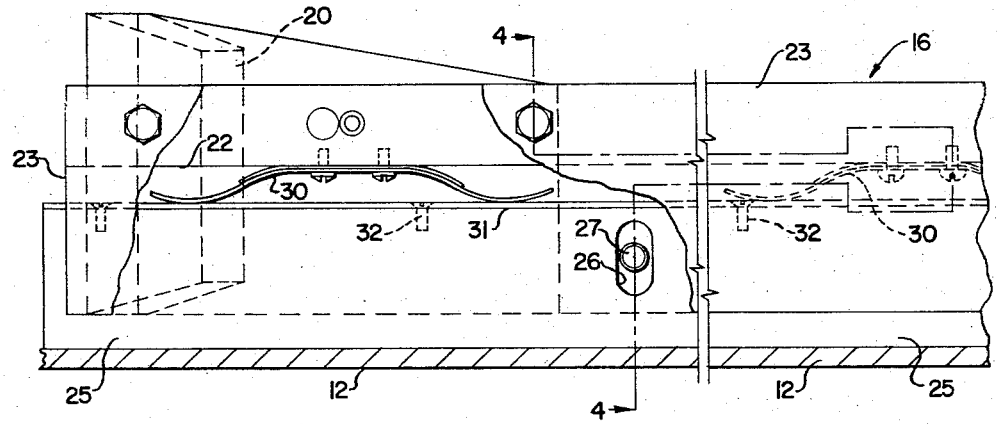
FIGURE 3 is a partial top-plan view of a scraping member mounted on the stirrer shown in FIGURE 1.
Figure 4:
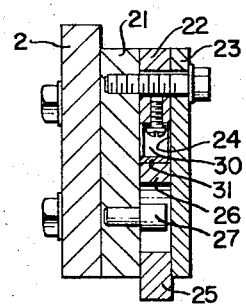
FIGURE 4 is a cross-section taken on the line 4—4 of FIGURE 3.
Figure 5:
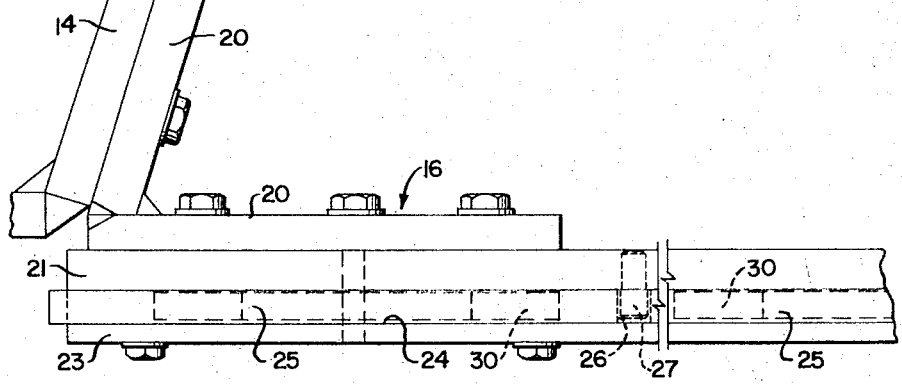
FIGURE 5 is a sectional elevation of the same scraping member mounted on the stirrer with the plane of the figure being a tangential plane of the vessel.

The FIGURE 3, 4 and 5 show in detail the design and mounting of the scraping member 16. Such a member is mounted on the helical members by means of angle brackets 20, of which the side in contact with a helical member such as 14 is specially adapted to the profile of the helical member. The scraping member 16 comprises a support formed by a plurality of plates 21, 22 and 23 which are bolted together to form a unitary structure. As seen in FIGURE 4, the plate 22 is shorter than plates 21 and 23 to form a longitudinal groove 24 which extends over the full length of the support. A relatively rigid scraping blade 25 may slide transversely in the groove 24. The sliding motion is provided by the combination of elongated slots 26 in the blade 25 and studs 27 secured to the support formed by plates 21, 22 and 23. A plurality of springs 30, preferably flat or leaf springs, are arranged between the bottom of the groove 24 and the opposite edge of the blade 25. They bias the blade 25 out of the groove in the radial plane of the vessel, thus pressing it against the vessel wall. The springs 30 are, of course, regularly distributed over the length of the blade 25. It should be noted that in the figure the blade 25 is assumed to be made of a plastic material, for example, tetrafluoroethylene, known by the trade name "Teflon." The edge of the blade which is in contact with the springs 30 may be reinforced by a reinforcing plate 31 secured by means of screws 32. This reinforcing plate permits a distribution of the thrust of the springs 30 along the length of the blade.

The scraping members 17 are substantially identical with the members 16. They vary in that as shown in FIGURE 1, they may be divided into two sub-members 40 and 41 joined by means of a U-shaped strap 42, the space 43 separating the two sub-members 40 and 41 being intended for the insertion of a temperature gauge.

The scraping blades such as 25 are advantageously made of "Teflon," a material which has the advantage of being able to withstand relatively elevated temperatures, while only developing an extremely low coefficient of friction when in contact with the wall of the vessel.

In order that the entire surface of the wall of the vessel is scraped by the scraping members such as 16 and 17, it is essential for the projection of the members 16 and 17 on the axis of the shaft 10 to cover the full axial length of the vessel. Preferably also the scraping members should be conveniently distributed around the shaft 10 in order not to unbalance the stirring device.

With relatively high stirrer speeds, it would be possible to use centrifugal force to force the scraping blades 25 against the walls of the vessel, omitting the springs 30 or their equivalents. Likewise, the helical members 13 and 14 are only an example of the stirring devices. The invention, of course, can be adapted to any type of stirring or agitating device.

I claim as my invention:

1. A stirring device for a cylindrical mixing vessel wherein said vessel and said stirring device rotate relative to each other about an axis, the improvement comprising:
    at least one cylindrical helical member mounted on a central shaft, said central shaft being disposed to rotate about the axis of said vessel;
    at least one support member, said support member being secured to said cylindrical helical member, said support member in addition having a groove formed therein and extending substantially parallel to said axis;
    a blade member, said blade member being disposed in said groove and adapted for sliding radial movement in and out of said groove; and
    biasing means for forcing said blade member radially out into contact with the wall of said vessel.

2. The stirring device of claim 1 having a plurality of scraping members disposed around the periphery of the cylindrical helical member, the projection of all scraping members covering the complete axial length of the central shaft.

References Cited by the Examiner
UNITED STATES PATENTS

| | | | |
|---|---|---|---|
| 1,883,167 | 10/1932 | Vickery | 15—256.51 |
| 2,188,551 | 1/1940 | Kaltenbach et al. | 259—109 |
| 2,645,911 | 7/1953 | Martin. | |
| 2,732,773 | 1/1956 | Smith | 15—256.51 |

WALTER A. SCHEEL, *Primary Examiner.*

R. W. JENKINS, *Assistant Examiner.*